United States Patent [19]

Giebel

[11] Patent Number: 4,979,437
[45] Date of Patent: Dec. 25, 1990

[54] OUTDOOR GRILL HAVING DUAL WARMING RACKS

[75] Inventor: Michael R. Giebel, Baxter Springs, Kans.

[73] Assignee: Sunbeam Corporation, Downers Grove, Ill.

[21] Appl. No.: 562,538

[22] Filed: Aug. 3, 1990

[51] Int. Cl.$^5$ .................... A47J 37/00; A47J 37/04
[52] U.S. Cl. .................................. 99/345; 99/448; 99/450; 126/25 R; 126/332; 126/334
[58] Field of Search ................ 99/345-347, 99/448, 449, 450, 482; 126/25 R, 9 R, 9 B, 332, 334, 335, 41 R, 337, 338; 312/273, 274

[56] References Cited

U.S. PATENT DOCUMENTS

| | | | |
|---|---|---|---|
| 3,520,290 | 7/1970 | Winters | 126/25 R |
| 3,527,154 | 9/1970 | Shaper | 99/446 |
| 3,905,286 | 9/1975 | LeGrady | 99/450 |
| 4,191,160 | 3/1980 | Elliott | 126/9 R |
| 4,192,283 | 3/1980 | Kridler et al. | 126/25 R |
| 4,628,896 | 12/1986 | Baynes | 99/400 |
| 4,667,652 | 5/1987 | Bunton | 99/450 |
| 4,686,958 | 8/1987 | Skelton et al. | 99/339 |
| 4,905,582 | 3/1990 | Lee | 99/450 |

FOREIGN PATENT DOCUMENTS 281561 12/1927 United Kingdom ............... 126/332

Primary Examiner—Timothy F. Simone
Attorney, Agent, or Firm—Neil M. Rose

[57] ABSTRACT

An outdoor grill having two food warming racks which are pivotally mounted in the upper housing member of the grill enclosure and which are interconnected to each other and to the lower housing member by links for supporting said racks in spaced parallel relation as the upper housing member is moved between its open and closed positions.

16 Claims, 3 Drawing Sheets

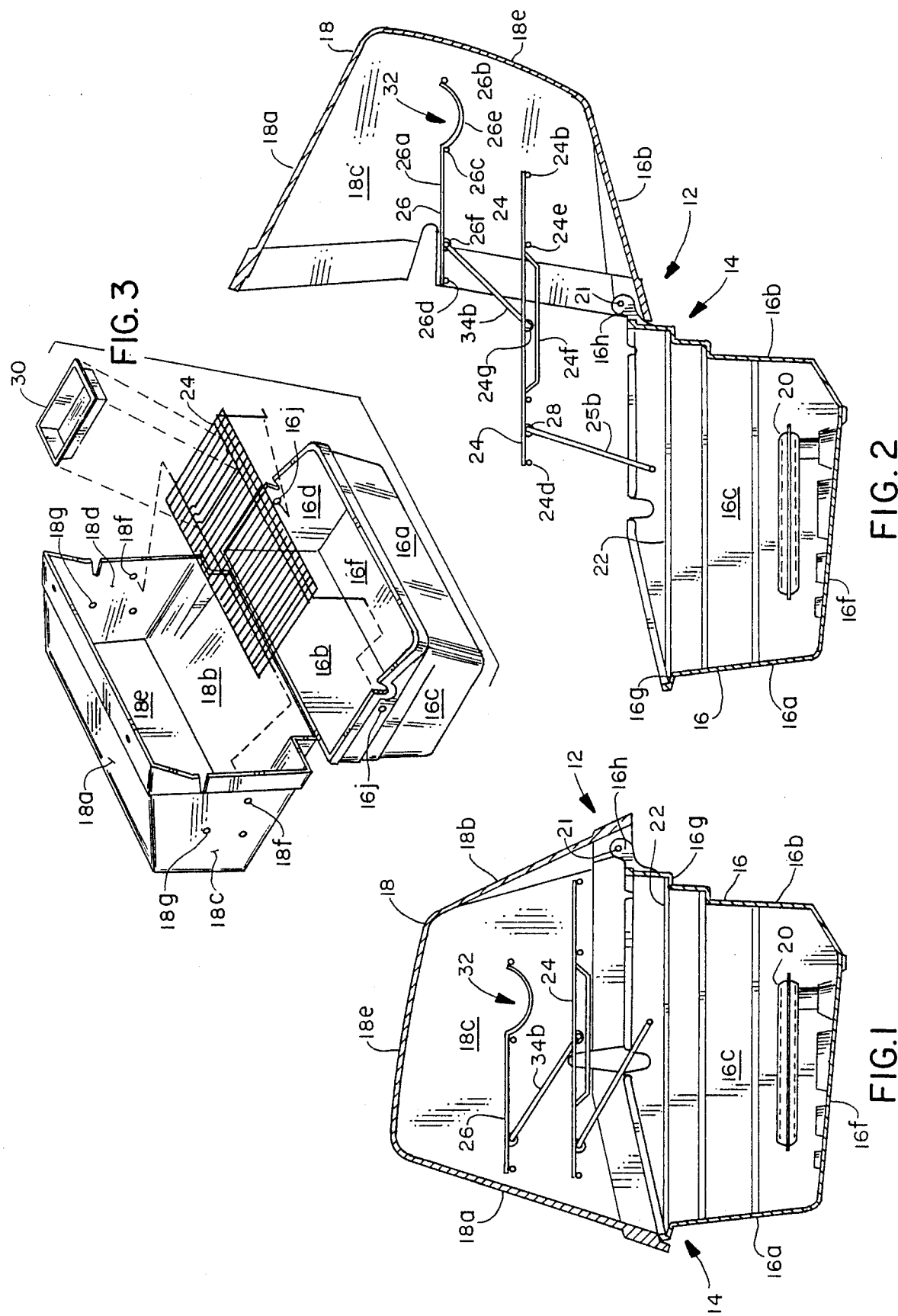

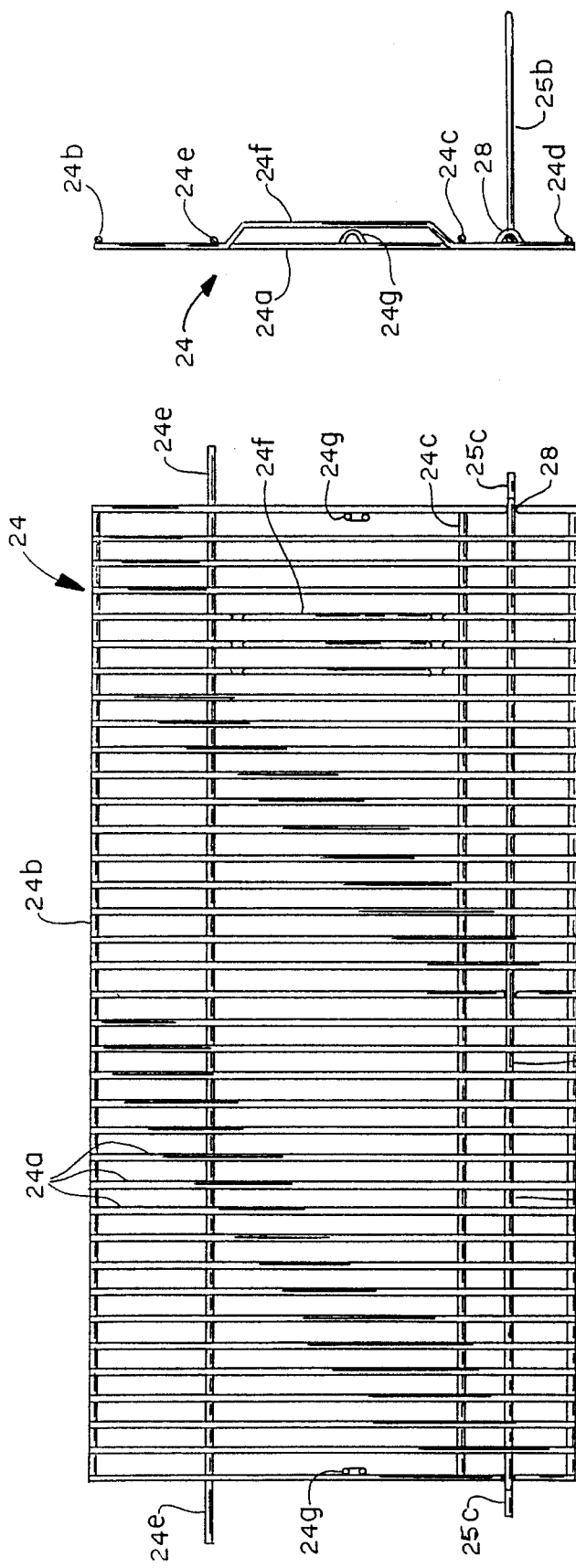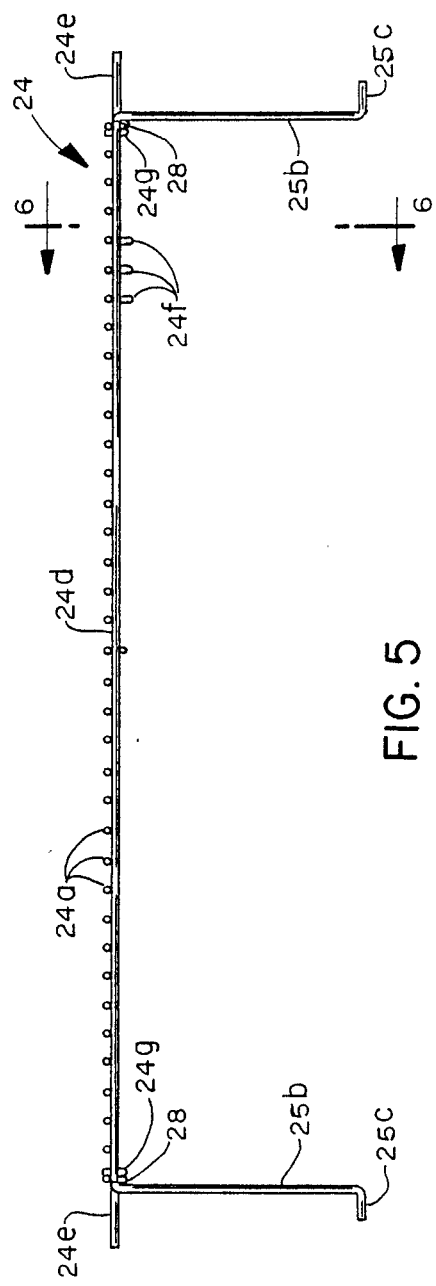

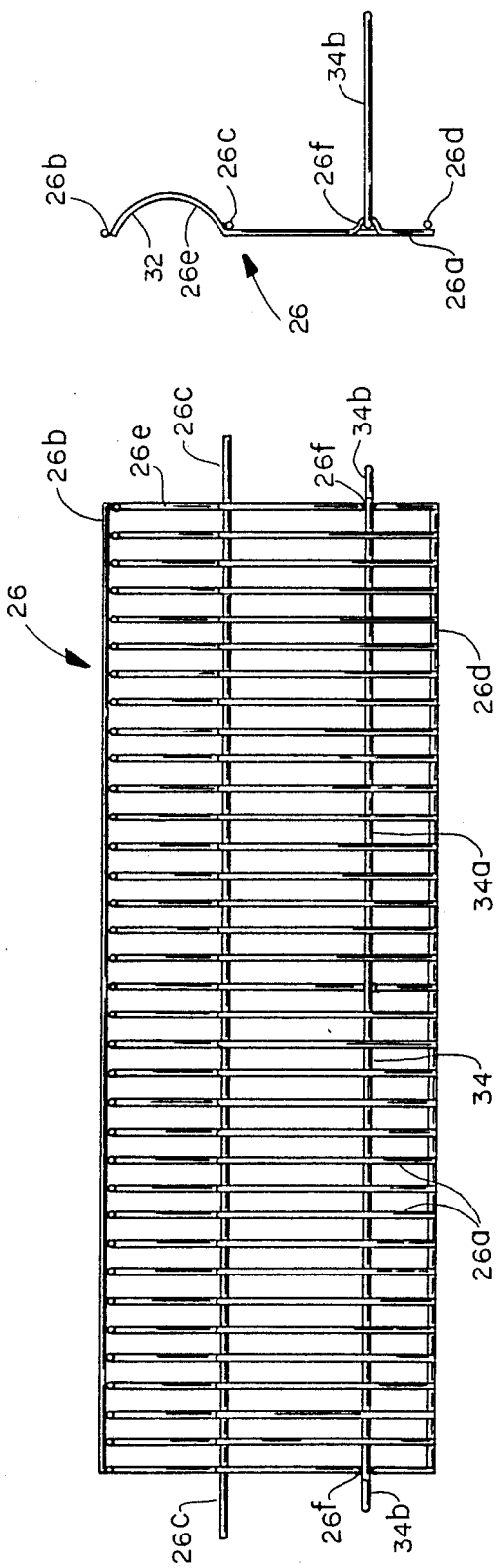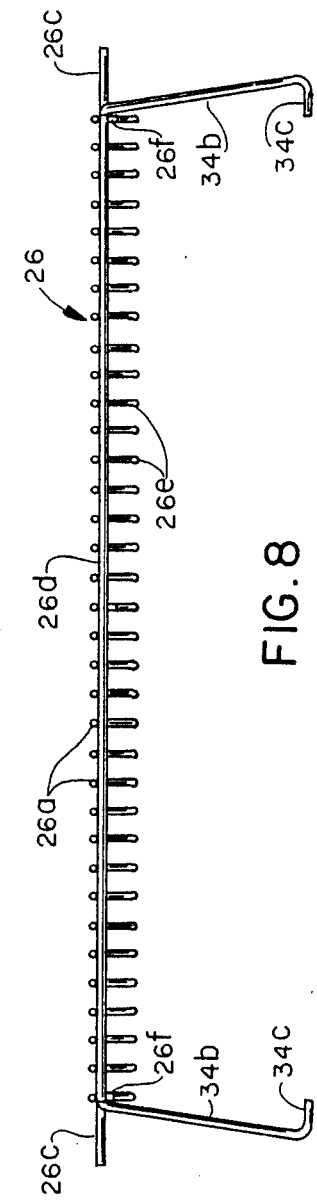

OUTDOOR GRILL HAVING DUAL WARMING RACKS

BACKGROUND OF THE INVENTION

This invention relates to outdoor barbecue grills and more particularly to a grill having 2 racks supported above the cooking grill on which to keep food warm while the cooking is taking place on the cooking grill.

Outdoor cooking is commonly performed in barbecue grills which are heated either by means of charcoal in the form of briquettes or propane which is stored in high pressure reservoirs and delivered through a regulator to a burner located in the grill. All of these grills typically have a lower housing member within which a bed of charcoal briquettes or a gas burner is supported beneath a food supporting or cooking grill. The grill is typically made of spaced parallel bars in a coplanar arrangement horizontally disposed at the upwardly facing opening at the lower housing member. A upper housing member is typically associated with the lower housing member to provide an enclosure within which the food may be cooked on the above described grill or perhaps on a rotating spit which may also be located within the enclosure. For ease and convenience of operation, the upper housing member is often hingeably connected to the lower housing member so that the upper housing member may be moved easily between its opened and closed positions to insert or remove food.

It is well known to provide barbecue grills of the type described above with warming racks or shelves which may be positioned above or spaced from the main cooking grill and which are designed to receive food which is to be cooked more slowly or merely retained at a warm temperature. Such racks or warming trays are typically formed of spaced parallel bars supported in a horizontal plane and adapted to be accessible when the upper housing member is pivoted to its open opposition. It is regarded as desirable to have the warming rack or shelf positioned above the food cooking grill when the upper housing member is in a closed position and retracted from above the cooking grill, when the upper housing member is moved to its open position. This displacement of the warming rack from above the cooking grill permits the user to have access to the cooking grill for loading and removing food. Examples of patents disclosing barbecue grills having such warming racks or shelves are the Winters U.S. Pat. No. 3,520,290, Bunton U.S. Pat. No. 4,667,652 and Murphy U.S. Pat. No. Des. 291,768.

It is well known in the cooking art to provide means for basting cooking foods with sauces, condiments and the like. It is sometimes considered desirable to maintain the basting liquid at an elevated temperature so that it does not have a tendency to cool the cooking meat to which it is applied. In this connection, attention is directed to the patent to Shaper, et al U.S. Pat. No. 3,527,154, which discloses a saucepan supported on the cooking grill to provide convenient access to sauce for basting the food. Also noted is the Fielding, et al U.S. Pat. No. Des. 296,861. While it is desirable to have a basting dish located conveniently to the cooking grill, it may be considered undesirable to have the basting dish occupy space on the cooking grill which would otherwise be available for positioning food to be cooked.

In providing a warming rack means for a barbecue grill, it is important that it be disposed in a location where it does not interfere with the use of the main cooking grill. It is also important that the warming rack is simple in construction so it adds little to the overall cost of the barbecue grill.

SUMMARY OF THE INVENTION

The present invention provides a food warming or slow cooking means including a pair of horizontally disposed racks which are pivotally connected to the upper housing member of a barbecue grill and are connected together and to the lower housing member by links which support the racks in spaced parallel relationship and cause them to move from a location above the cooking grill when the upper housing member is closed to a location substantially withdrawn from above the cooking grill when the upper housing member is pivoted to its retracted position.

The lowermost of the two racks is provided with means for supporting a shallow pan in which a basting sauce or liquid may be contained so that it is warmed by the cooking medium and at the same time, it is readily available to apply to the food being cooked on the grill. The upper most rack is formed with an upwardly facing channel running along the rear edge so that items disposed on the upper rack will not have a tendency to roll off. The channel is also suitable for receiving items such as corn, rolls, potatoes, or the like, which might have a tendency to roll off the generally flat warming rack or tray.

Accordingly, it is an object of the present invention to provide an improved barbecue grill having a simplified food warming means including a pair of spaced horizontal disposed racks.

It is another object of the present invention to provide a barbecue grill with a simplified food warming means including superimposed food warming racks which in the operative position of the barbecue grill are located above the cooking grill and in the loading position of the barbecue grill are displaced upwardly and laterally, to permit easy access to the cooking grill.

It is another object of the present invention to provide dual warming racks for barbecue grills that are simple in construction and are easily assembled to the upper and lower housing members of a barbecue grill.

Further objects and advantages of the present invention will become apparent as the following description proceeds and the features of novelty which characterize the invention will be pointed out in the claims annexed hereto and forming a part of this specification.

BRIEF DESCRIPTION OF THE DRAWINGS

FIG. 1 is a end elevational view of a gas barbecue grill embodying my invention and shown with the upper housing member in a closed position, the upper and lower housing members being sectioned for illustration purposes;

FIG. 2 is an end elevational view of the barbecue grill of FIG. 1 but shows the upper housing member of the barbecue grill in the opened position to illustrate the positions assumed by the warming racks;

FIG. 3 is a exploded perspective schematic view showing the upper and lower housing members and the lower warming rack with dash lines indicating how it is assembled to the upper and lower housing members;

FIG. 4 is a top plan view of the lower warming rack;

FIG. 5 is a front elevational view of the lower warming rack;

FIG. 6 is a sectional view taken on line 6—6 of FIG. 5;

FIG. 7 is a top plan view of the upper warming rack;

FIG. 8 is a front elevational view of the upper warming rack; and

FIG. 9 is an end elevational view of the upper warming rack.

Referring to FIGS. 1 and 2 of the drawings, there is shown a barbecue grill which is identified generally by the reference numeral 12. The barbecue grill 12 includes a housing 14 which comprises a lower housing member 16 and an upper housing member 18. The housing members 16 and 18 are typically formed of a die cast aluminum material which is resistant to corrosion and has a long service life. The lower member 16 has side walls 16a, 16b, 16c and 16d. In both FIG. 1 and FIG. 2, the right side walls of the upper and lower housing members have been cut away for illustrative purposes to expose the interior of the housing 14. A front side wall 16a is located opposite to a rear side wall 16b whereas end side walls 16c and 16d, shown only in FIG. 3, are opposite each other. The lower housing member 16 is further provided with a bottom wall 16f which supports a typical propane burner 20, to which is connected an air-gas mixing venturi and a source of propane connected to the housing by conduit means as is well known in the art.

It should be understood that in lieu of the propane burner 20, a grate means could be provided to support a bed of charcoal briquettes. The invention disclosed herein is applicable equally to either propane or charcoal barbecue grills.

Also located within the lower housing member 16, is a food supporting or cooking grill 22, which takes the form of closely spaced parallel rods supported in a horizontal plane by interconnecting bars as is well known in the art. The cooking grill 22 is typically supported on a peripherally extending shoulder 16g, which has an upwardly facing supporting surface to receive the periphery of the cooking grill 22.

The upper housing member 18 is similar in shape to the lower housing member 16, but inverted so that the two housing members meet on a generally horizontal plane to form a cooking enclosure comprising housing 14. The upper housing member 18 has a front sidewall 18a, a rear sidewall 18b, and opposed end side walls 18c and 18d. The upper housing 18 also is formed with a top wall 18e.

In order to hingeably connect the upper and the lower housing members together the lower housing member 16 is formed with integrally cast bearing portions 16h, through which axle members 21 extend into bearing openings in the upper housing member 18. Thus the upper housing member or cover 18 is supported so it may rotate from the closed position shown in FIG. 1 to an open position as shown in FIG. 2. Stop means are provided by interengaging portions of the upper and lower housing members to restrain the upper housing member 18 from rotating beyond the position shown in FIG. 2 in which it extends somewhat vertically with the center of mass being to the right of its pivot axis so that it remains in the open position when so positioned.

All food intended to be cooked in a conventional manner is placed on the grill 22 when the barbecue grill 12 is in the opened position shown in FIG. 2. With the gas burner ignited and the food in place on the grill 22, the cover or upper housing member 18 is rotated to the closed position to allow the cooking to proceed efficiently. It is frequently desirable to warm foods such as bread, or the like, or to cook some foods more slowly than those that might be positioned on the grill 22. For these purposes there has been provided a lower warming rack 24 and an upper warming rack 26.

The lower warming rack 24, is shown in detail and disassembled from the barbecue grill 12 in FIGS. 4, 5 and 6. The warming rack 24 consists of a plurality of parallel, coplanar rods 24a, which are interconnected and welded to lengthwise extending bars 24b, 24c and 24d. The lower rack 24 is pivotally connected to the upper housing member 18 by a pivot bar 24e, which is parallel to the bars 24b, 24c and 24d, but is greater in length having ends which extend outwardly beyond the outermost of the rods 24a. The upper housing member 18 has the opposed sidewalls 18c and 18d formed with openings 18f as best shown in FIG. 3 which receive and pivotally support the lower rack 24 with respect to the upper housing member 18.

To support the forward edge of the lower rack 24, there is provided a U shaped bail 25 which includes a central portion 25a, supported between and paralleling the bars 24c and 24d and having downwardly extending legs 25b, which form links to interconnect the lower rack 24 with the lower housing member 16. The bail 25 is secured to the rack 24 by means of bearing troughs 28 formed in three of the rods 24a as best shown in FIGS. 5 and 6. The troughs 28 are formed in the outermost rods 24a as well as the center one of the rods 24a providing three bearing points in which the portion 25a of bail 25 is mounted for pivotal movement. The lower ends of the links 25b are formed outwardly with projections 25c, which assemble into engagement with openings 16j formed in the opposed side walls 16c and 16d of the lower housing member 16.

Thus the lower rack 24 is supported at its rear edge by the bar 24e and at its forward edge by the links 25b. As shown in FIG. 1 with the cover 18 its closed position, the rack 24 is in a horizontal position immediately above the cooking grill 22. When the cover 18 is rotated to the open position as shown in FIG. 2, the lower rack 24 moves upwardly and laterally with respect to the grill 22, but still is maintained in a substantially horizontal position. In the open position of the cover 18, the rack 24 is sufficiently raised and displaced as to provide easy access to the cooking grill 22 to add or remove food therefrom.

The lower rack 24 is provided with means to support a flat pan 30 shown in FIG. 3 which is intended to receive basting liquid or sauces. In a preferred embodiment the pan 30 was a commercially available disposable aluminum foil baking pan. The rack 24 has a depressed area formed by three of the rods 24 being displaced downwardly at 24f, as shown best in FIGS. 4, 5 and 6. The basting pan 30 is of appropriate length and width to rest within the depression formed by the downwardly formed rods at 24f, so that the adjacent rods 24a restrain the pan 30 from movement with respect to the rack 24. With the pan positioned on the rack 24 it is in a convenient location to dispense the basting liquid onto the food being cooked on the grill 22. In addition, the basting pan 30 is positioned above the grill 22 so that the contents are heated during the cooking operation.

The upper rack 26 shown in detail in FIG. 7, 8 and 9, is generally similar in configuration to the lower rack 24. The rack 26 is formed with transversely extending rods 26a which are parallel and substantially coplanar and are supported and interconnected by lengthwise extending bars 26b, 26c and 26d. The bar 26c is elongated beyond the outermost rods 26a and serves as the means for pivotally mounting the upper rack 26 with respect to the upper housing member 18. The end side walls 18c and 18d are formed with openings 18g, which receive and serve as bearings for the outer ends of the bar 26c. The rods 26a are formed with U shaped rearwardly extending ends 26e as best shown in FIG. 9. The U shaped portions 26e of the rods 26a together form an upwardly facing channel 32 extending along the back edge of the rack 26. The channel 32 serves to prevent items from rolling off the back edge of the rack 26 or simply for locating and receiving items which might tend to roll off the horizontal rack. Thus baked potatoes, rolls, corn and other items may be placed within the channel 32 to assure that they will not be displaced from the rack 26.

To support the front of the rack 26 there is provided a U shaped support means or bail 34, having a central portion 34a and downwardly extending links 34b on both ends thereof. The bail 34 is mounted in similar fashion to the bail 25 on the lower rack 24 by means of U shaped troughs 26f formed on the outermost and middle one of the rods 26a, as best shown in FIGS. 7 and 9. The portion 34a of the bail 34 is thus journaled for rotating movement with respect to the upper rack 26. The lower ends of the links 34b are formed with inwardly extending projections 34c, which engage bearing openings 24g formed on the outermost rods 24a of the lower rack 24 as shown best in FIGS. 4 and 6. This provides a pivotal connection between the links 34b and the lower rack 24.

Thus the upper rack 26 as supported toward its rear edge by the pivot bar 26c and toward its forward edge by bail 34, which interconnects with the lower rack 24. As shown in FIG. 1, the upper rack 26 as supported in the closed position of the cover 18 is substantially above and coextensive with the lower rack 24. When the cover is moved to the open position as shown in FIG. 2, the upper rack 26 is displaced laterally and raised with respect to the cooking grill 22, the rack 26 being substantially within the cover 18. In the open position of the cover 18, both of the racks 24 and 26 are easily accessible for loading and removing food, as is the cooking grill 22.

Accordingly there has been provided a simple and efficient means of increasing the capacity of the barbecue grill 12 by simply adding the two racks 24 and 26 which are easily assembled to the upper and lower housing members 18 and 16.

What is claimed as new and desired to be secured by Letters Patent of the United States is:

1. A barbecue grill comprising upper and lower housing members which are hingeable connected along adjacent edges to form a closed housing within which food is grilled, said lower housing member having side walls and a bottom wall and an upwardly facing opening in which a horizontally disposed cooking grill is supported, a gas burner positioned in said lower housing member beneath said cooking grill, said upper housing member having side walls and a top wall and being pivotal about said hingeable connection between a closed position in which said upper and lower housing member side walls abut to form an enclosure to an open position in which said upper housing member is pivoted laterally from its position above said cooking grill, a dual warming rack supported by said housing members and including an upper warming rack and a lower warming rack, each said rack being generally planar in shape and being pivotally connected to opposed side walls of said upper housing member to support said racks in a generally horizontal position as said upper housing member is pivoted between said open and closed positions, said pivotal connection being on spaced parallel horizontal axes, first support links each being pivotally connected at one end to opposed side walls of said lower housing member for rotation about a horizontal axis and each being pivotally connected at its other end to said lower rack, second support links each being pivotally connected at one end to said upper rack and at the other end to said lower rack.

2. The barbecue grill of claim 1 wherein said upper rack is completely within said upper housing member when said upper housing member is in said open position, said upper rack and said lower rack and said cooking grill being in opposed spaced parallel relation when said upper housing member is in the closed position.

3. The barbecue grill of claim 2 wherein said lower rack is formed with means to receive and support a liquid containing basting pan above said cooking grill.

4. The barbecue grill of claim 3 wherein each said upper and lower rack is elongated in the direction lengthwise of its pivotal mounting to said upper housing member, said racks being formed by a plurality of parallel spaced rods extending transverse to said lengthwise direction, one of said racks being formed with a lengthwise extending upwardly facing channel to receive food articles and restrain them from rolling off said one rack.

5. The barbecue grill of claim 4 wherein said spaced rods are connected by lengthwise extending bars on opposite lengthwise extending edges of said racks, each rack having an intermediate bar parallel to said bars on the edges and extending beyond said rods to pivotally support said racks in aligned openings in said upper housing member sidewalls.

6. A gas barbecue grill comprising a housing enclosure including upper and lower housing members, each of which has said side walls which terminate at abutting edges, said edges being disposed on a generally horizontal plane, said housing members being pivotally connected along one of said abutting edges to provide movement of said upper housing member between a closed position in engagement with said lower housing member to an open position disposed laterally of said lower housing member, gas burner means disposed within said lower housing member beneath a cooking grill which is supported by said lower housing member, a lower and an upper food warming rack mounted on said upper housing member, means pivotally connecting said warming racks to said upper housing member, linkage means connecting said warming racks to said lower housing member to cause said racks to move from a first horizontal position when said upper housing member is in said closed position to a second horizontal position when said upper housing member is in said open position, said warming racks in said first horizontal position being spaced one above the other and above said cooking grill, said warming racks in said second horizontal position being elevated and displaced laterally from said first horizontal position to provide access to said cooking grill.

7. The combination of claim 6 wherein said linkage means includes a first link extending between said upper rack and said lower rack and pivotally connected to rotate with respect to each rack about an axis spaced from the axis of pivotal mounting of each said rack with respect to said upper housing member.

8. The combination of claim 7 wherein said linkage means includes a second link pivotally connected to said lower rack and to said lower housing member, said pivotal connection of said second link to said lower rack being spaced from the axis of pivotal mounting of said lower rack with respect to said lower housing member.

9. The combination of claim 6 wherein said upper warming rack in said second horizontal position being positioned entirely within said upper housing member and said lower warming rack in said second horizontal position being positioned partially within said upper housing member with a portion extending above said cooking grill.

10. The combination of claim 6 wherein said lower warming rack is formed with a generally flat supporting surface formed by spaced parallel rods, a recess formed in said surface to receive a basting sauce pan, said recess being defined by downwardly displaced segments of several adjacent ones of said rods, and a basting sauce pan mounted in said recess and restrained from horizontal movement by said rods adjacent to said recess.

11. The combination of claim 8 wherein each said first link and said second link is generally U-shaped having a central portion which extends the length of each warming rack and is secured thereto for rotation about an axis parallel to the axis about which each said rack pivots with respect to said upper housing member, said links having spaced parallel legs extending from the ends of said central portion and being pivotally connected at their free ends.

12. The combination of claim 10 wherein said upper warming rack is formed with a generally flat supporting surface, said upper warming rack being elongated in the direction of its axis of pivotal connection to said upper housing member, an upwardly facing elongated depression formed in said supporting surface extending along one edge in the direction of said axis of pivotal connection.

13. A gas barbecue grill comprising a housing enclosure including upper and lower housing members having walls which abut on a generally horizontal plane to form a cooking enclosure, said housing members being pivotally connected to provide movement of said upper housing member between a closed position in engagement with said lower housing member to an open position disposed laterally of said lower housing member, a cooking grill supported by and within said lower housing member, a lower and an upper food warming rack mounted on said upper housing member, means pivotally connecting said warming racks to said upper housing member, linkage means connecting said warming racks to said lower housing member to cause said racks to move from a first horizontal position when said upper housing member is in said closed position to a second horizontal position when said upper housing member is in said open position.

14. The combination of claim 13 wherein said linkage means includes a first link extending between said upper rack and said lower rack and pivotally connected to rotate with respect to each rack about an axis spaced from the axis of pivotal mounting of each said rack with respect to said upper housing member.

15. The combination of claim 14 wherein said linkage means includes a second link pivotally connected to said lower rack and to said lower housing member, said pivotal connection of said second link to said lower rack being spaced from the axis of pivotal mounting of said lower rack with respect to said lower housing member.

16. The combination of claim 15 wherein each said first link and said second link is generally U-shaped having a central portion which extends the length of each warming rack and is secured thereto for rotation about an axis parallel to the axis about which each said rack pivots with respect to said upper housing member, said links having spaced parallel legs extending from the ends of said central portion and being pivotally connected at their free ends.

* * * * *